United States Patent
Kirk et al.

(10) Patent No.: US 8,688,987 B2
(45) Date of Patent: Apr. 1, 2014

(54) SECURE KEY DISTRIBUTION WITH GENERAL PURPOSE MOBILE DEVICE

(75) Inventors: James Christopher Kirk, Clarksville, MD (US); Michael L. Olive, Cockeysville, MD (US); Louis T. Toth, Baltimore, MD (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/561,372

(22) Filed: Jul. 30, 2012

(65) Prior Publication Data

US 2014/0032903 A1    Jan. 30, 2014

(51) Int. Cl.
*H04L 9/00*    (2006.01)

(52) U.S. Cl.
USPC ............... 713/171; 726/6; 713/183; 713/186

(58) Field of Classification Search
USPC .................. 713/168, 171, 182–183, 186; 380/277–278, 282; 726/6
See application file for complete search history.

(56) References Cited

U.S. PATENT DOCUMENTS

| 4,281,216 | A | | 7/1981 | Hogg et al. |
| 5,093,860 | A | * | 3/1992 | Steinbrenner et al. ........ 380/273 |
| 6,677,888 | B2 | | 1/2004 | Roy |
| 2007/0244608 | A1 | * | 10/2007 | Rath et al. .......................... 701/3 |
| 2010/0074446 | A1 | | 3/2010 | Fuchs et al. |
| 2010/0262715 | A1 | * | 10/2010 | Tamalet et al. ............... 709/238 |
| 2012/0309353 | A1 | * | 12/2012 | Markov et al. ................ 455/411 |

FOREIGN PATENT DOCUMENTS

WO    0131837    5/2001

OTHER PUBLICATIONS

European Patent Office, "European Search Report", "from Foreign Counterpart of U.S. Appl. No. 13/561,372", Dec. 5, 2013, pp. 13, Published in: EP.

* cited by examiner

*Primary Examiner* — Samson Lemma
(74) *Attorney, Agent, or Firm* — Fogg & Powers LLC

(57) ABSTRACT

One embodiment is directed to a method for managing cryptographic information. The method includes initiating cryptographic information loading application on a general purpose mobile device (GPMD) and establishing a connection between the GPMD and a server that includes cryptographic information. Authentication input is received from a user of the GPMD. Data identifying the GPMD and the authentication input is sent from the GPMD to the server for authentication of the GPMD and the user. The GPMD also sends data identifying an electronic device into which cryptographic information is to be loaded. In response, the GPMD receives cryptographic information for the electronic device at the GPMD from the server. The GPMD then sends the cryptographic information from the GPMD to the electronic device for loading therein.

20 Claims, 2 Drawing Sheets

SECURE KEY DISTRIBUTION WITH GENERAL PURPOSE MOBILE DEVICE

BACKGROUND

Often cryptographic information (e.g., secret and private cryptographic keys) must be loaded into an electronic device while maintaining the secrecy of that cryptographic information. This can present a challenge when it is desirable to send the cryptographic information over the internet to the electronic device. One example of this includes the loading of cryptographic information into an avionic device to support secure (e.g., encrypted) airline communications and other secure communications via air-ground links such as the Aircraft Communications Addressing and Reporting System (ACARS). Conventional avionic key loading systems use a key loading appliance, which is an electronic device dedicated to loading keys in other electronic (e.g., avionic) devices. Because a key loading appliance is dedicated to key loading (i.e., the appliance is configured to perform only key loading and related functions) the key loading appliance can cost between $5,000 to $10,000 dollars.

SUMMARY

One embodiment is directed to a method for managing cryptographic information. The method includes initiating cryptographic information loading application on a general purpose mobile device (GPMD) and establishing a connection between the GPMD and a server that includes cryptographic information. Authentication input is received from a user of the GPMD. Data identifying the GPMD and the authentication input is sent from the GPMD to the server for authentication of the GPMD and the user. The GPMD also sends data identifying an electronic device into which cryptographic information is to be loaded. In response, the GPMD receives cryptographic information for the electronic device at the GPMD from the server. The GPMD then sends the cryptographic information from the GPMD to the electronic device for loading therein.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
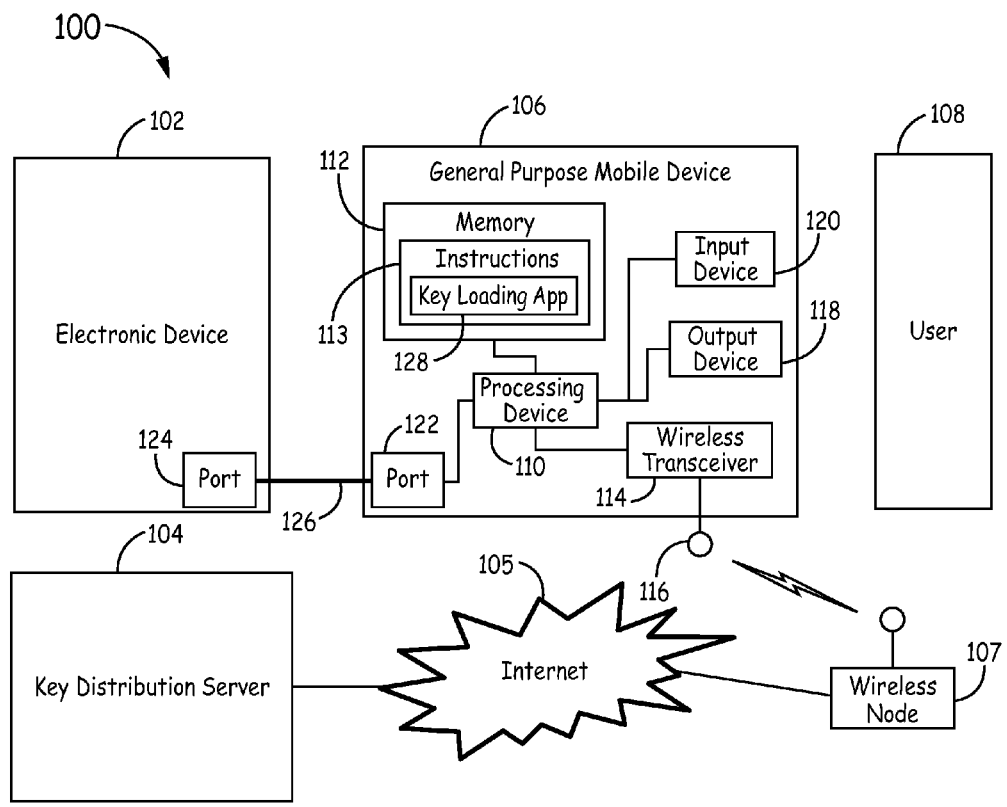
FIG. 1 is a block diagram of an example system for cryptographic information distribution using a general purpose mobile device.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of an example system 100 for cryptographic information distribution. The system 100 includes an electronic device 102 into which cryptographic information is to be loaded and a key distribution server 104 from which the cryptographic information is obtained. The key distribution server 104 can store and/or generate a plurality of cryptographic information to be loaded in a plurality of electronic devices. The key distribution server 104 has general connectivity to the Internet 105 (e.g., the world wide web) and can communicate with any device capable of communicating over the Internet 105, subject to the security mechanisms discussed below.

The cryptographic information for the electronic device 102 is retrieved from the key distribution server 104 and provided to the electronic device 104 with a general purpose mobile device (GPMD) 106. The GPMD 106 is a user-programmable computing device that is capable of communicating over the Internet 105. For example, the GPMD 106 can include a mobile phone (e.g., a smart phone), tablet, laptop, netpad, personal digital assistant (PDA), or other mobile device. Any of the preceding devices can communicate with the Internet 105 and other network(s) via a terrestrial link (as in a cellular phone), a satellite link (as in a satellite phone), or both. The GPMD 106 includes the capability to communicate with a wireless node 107 for connection to the Internet 105 and other network(s). The GPMD 106 can communicate with any suitable wireless node 107 in any suitable external network using any suitable protocol. For example, the wireless node 107 can be a Wi-Fi based access point and the GPMD 106 can communicate with the Wi-Fi based access point using an IEEE 802.11 based protocol. In another example, the wireless node 107 can be an antenna communicatively coupled to a base station providing cellular voice and/or data service. In this example, the GPMD 106 can communicate with the base station using a 3G protocol (e.g., GSM, CDMA2000, etc.) or a 4G protocol (e.g., WiMax, LTE). In yet another example, the wireless node 107 can be a satellite based node and can have a suitable wireless connection to a ground station and the Internet 105. In other examples, the GPMD 106 can communicate using other communication protocols including protocols not established as of the filing of this application.

The GPMD 106 is "general purpose" as used herein, because the GPMD 106 is not dedicated to key loading and is a user-programmable device. In contrast, a dedicated key loading device is configured to perform only key loading and related functions. As an example of "general purpose", in embodiments where the GPMD 106 is a mobile phone, the GPMD 106 is capable of placing and receiving cellular phone calls via one or more cell towers or satellite transceivers and a base station. Additionally, the GPMD 106 is capable of Internet browsing via its connection with the wireless node 107. The GPMD 106 may also be capable of executing email applications, video game applications, document generation applications, personal organization programs (e.g., calendar and/or contact applications), other applications, and/or capturing photographs and videos. Finally, the GPMD 106 is user-programmable in that a user 108 of the GPMD 106 can add and/or remove programs (e.g., "apps") from the GPMD 106. Advantageously, the GPMD 106 can be a device that is not wholly controlled by the entity managing the key distribution server 104. This enables the GPMD 106 to be one of the myriad consumer mobile devices possessed by users, eliminating the need for a costly dedicated key appliance.

The GPMD 106 can include one or more processing devices 110 coupled to one or more memory devices 112. The one or more memory devices 112 can include instructions 113 which, when executed by the one or more processing devices 110, can cause the one or more processing devices 110 to perform one or more acts. As used herein, the GPMD 106 is configured to perform a function when the memory device(s) 112 includes instructions 113 which, when executed by the processing device(s) 110, cause the processing device(s) 110 to perform the function.

In an example, the one or more processing devices 110 can include a central processing unit (CPU), microcontroller, microprocessor (e.g., a digital signal processor (DSP)), field programmable gate array (FPGA), application specific integrated circuit (ASIC), or other processing device. The one or more memory devices 112 can include any appropriate processor readable medium used for storage of processor readable instructions or data structures. Suitable processor readable media can include tangible media such as magnetic or optical media. For example, tangible media can include a conventional hard disk, solid state hard drive (SSD), compact disk (e.g., read only or re-writable), volatile or non-volatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc. Suitable processor-readable media can also include transmission media such as electrical, electromagnetic, and digital signals, conveyed via a communication medium such as a network and/or a wireless link. Moreover, it should be understood that the instructions 113 can be disposed on a processor readable media that is integrated into the GPMD 106 as in, for example, RAM, or can be a separate item to which access can be provided to the GPMD 106 as in, for example, portable media such as an optical disk or flash drive.

The GPMD 106 also includes a wireless transceiver 114 coupled to an antenna 116 for communication with the wireless node 107. As mentioned above, the wireless transceiver 114 can implement a communication protocol such as IEEE 802.11, WiMax, and/or LTE for communication with the wireless node 107. The GPMD 106 also includes one or more output devices 118 to provide information to a user 108. The one or more output devices 118 can include one or more displays, speakers, lights, a haptic feedback generator, or other mechanism. The GPMD 106 also includes one or more input devices 120 to receive input from a user 108. The one or more input devices 120 can include a keyboard, keypad, microphone, mouse, a touchpad, a touchscreen that is integrated with a display, and/or other device. The one or more output devices 118 and input devices 120 can be integrated into a main body of the GPMD 106 or can a peripheral device communicatively coupled to a main body of the GPMD 106.

The following description may refer to the one or more processing devices 110, the one or more memory devices 112, the one or more output devices 118, and the one or more input devices 120 in the singular form (e.g., the processing device 102); however, it should be understood that in many cases the singular form is used for simplicity and that use of the singular form may be not intended to limit these components to a single component unless otherwise specified. Accordingly, although the singular form is used, it should be understood that in many cases one or more of the particular components can be used as indicated above.

The GPMD 106 also includes a port 122 for direct communication with other devices, such as the electronic device 102. This port 122 can be a bi-directional communication port configured to accept a plug of a wired medium (e.g., a proprietary port, such as the port on a mobile phone used for data communication and charging of the battery of the phone, or a standardized port, such as a universal serial bus (USB) port or Ethernet port). The electronic device 102 can also include a port 124 for direct communication with other devices, such as the GPMD 106. Accordingly, one end of a suitable wired communication medium 126 can be coupled to the port 122 of the GPMD 106 and the other end of the communication medium 126 can be coupled to the port 124 in the electronic device 102. In some examples, the GPMD 106 can include a short range wireless transceiver, such as a transceiver capable of communicating according to a Bluetooth or ZigBee protocol, for direct wireless communication with other devices, such as the electronic device 102. Similarly, the electronic device 102 can include a short range wireless transceiver, such as a transceiver capable of communicating according to a Bluetooth or ZigBee protocol, for direct wireless communication with other devices, such as the GPMD 106. Finally, the GPMD 106 and electronic device can include respective infrared ports for infrared communication therebetween. Other physical layer means of communication are also possible.

The instructions 113 on the memory device 112 include a key loading application 128 that enables the GPMD 106 to retrieve cryptographic information from the key distribution server 104 and send the cryptographic information to the electronic device 102. The key loading application 128 can be installed on the GPMD 106 by the user 108. The key loading application 128 can be downloaded from a server over the Internet 105, can be installed from a flash drive, or obtained from some other location.

Figure 2:
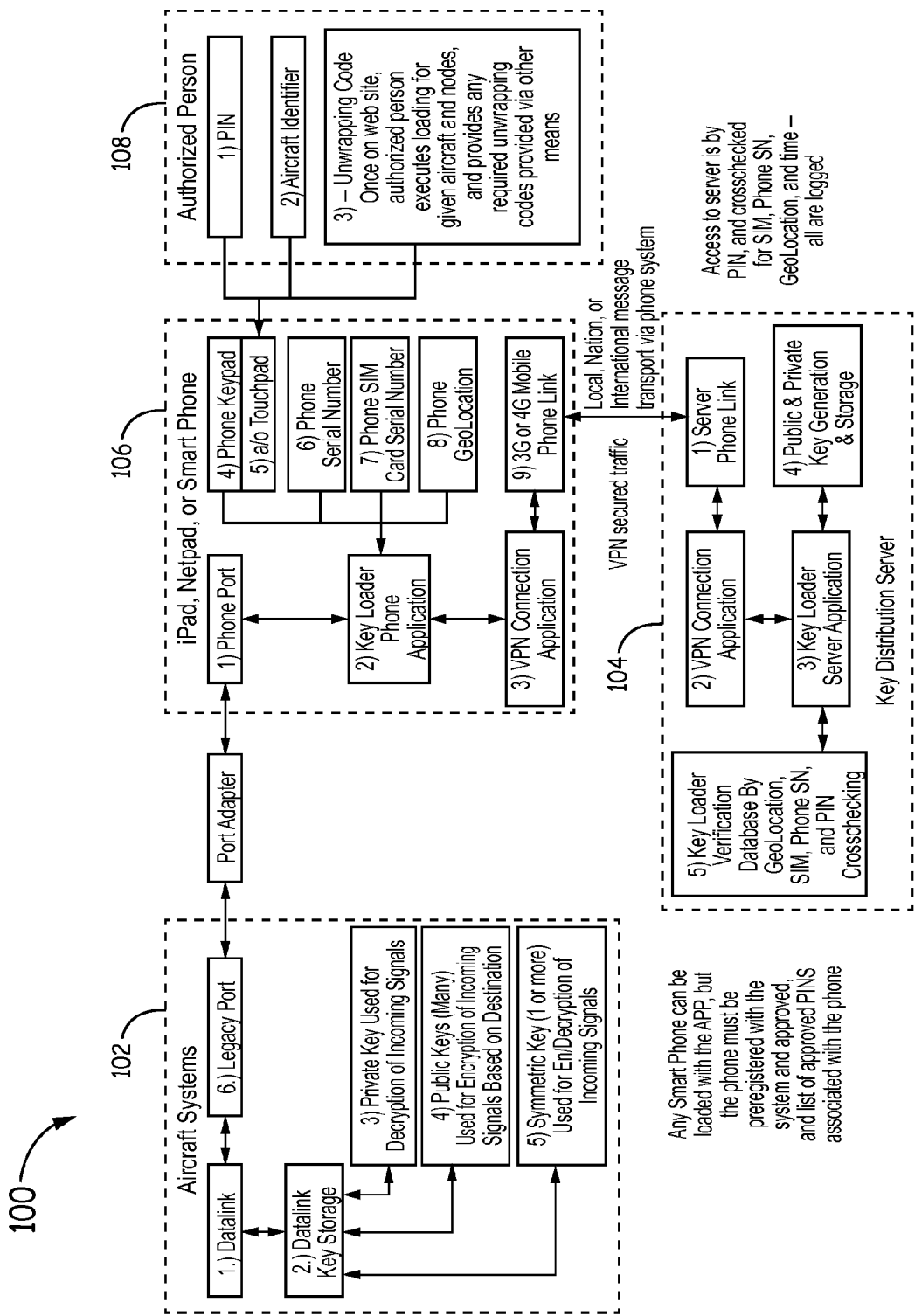
FIG. 2 is another block diagram of the system of FIG. 1 illustrating functional attributes of the system.

FIG. 2 is another block diagram of an example of system 100 illustrating functional attributes of the system 100. A user 108 of the GPMD 106 can cause the key loading application 128 to initiate on the GPMD 106. The user 108 can cause the key loading application to initiate in any appropriate manner such as by selecting an icon corresponding to the key loading application 128 on a touchscreen display of the GPMD 106. In response to selecting the icon, the GPMD 106 can initiate the key loading application 128.

In addition to causing initiation of the key loading application 128, the user 108 can also couple the GPMD 106 to the electronic device 102 such as by connecting the wired communication medium 126 to the port 122 in the GPMD 106 and to the port 124 in the electronic device 102. In examples where the GPMD 106 is wirelessly coupled to the electronic device, the GPMD 106 can establish a wireless connection with the electronic device and the key loading application 128 can establish communication with the electronic device 102 over the wireless connection. Once the GPMD 106 is coupled to the electronic device 102, the key loading application 128 can establish communication with the electronic device 102.

Initiation of the key loading application 128 can establish a connection with the key distribution server 104. The key loading application 128 can establish a connection by sending messages to the wireless node 107 for transmission over the Internet 105 to the key distribution server 104. In an example, the connection between the key loading application 128 and the key distribution server 104 is secured, such as for example, using a virtual private network (VPN) connection.

The key loading application 128 can also prompt a user for an authentication input. The authentication input can be any information input into the GPMD 106 that can be used to verify the authenticity of the user 108. For example, the authentication input can include a password (e.g., a PIN, code, swipe pattern), biometric data (e.g., a fingerprint scan), and/or an input from another device (e.g., an RFID card). Upon receiving the prompt, the user 108 can enter the authentication input via the appropriate input device 120 of the GPMD 106. The key loading application 128 receives the authentication input and, once a connection is established with the key distribution server 104, the key loading application 128 sends the authentication input to the key distribution server 104. The key distribution server 104 receives the authentication input from the GPMD 106 and authenticates the user 108 based on the authentication input. For example, the key distribution server 104 can compare the authentication input (e.g., a PIN) to a list of authorized user's information (e.g., authorized PINs).

The key distribution server 104 can also authenticate the GPMD 106. To authenticate the GPMD 106, the GPMD 106 can provide identifying information to the key distribution server 104. The identifying information can include one or more of a serial number of the GPMD 106, a serial number of a SIM card in the GPMD 106, a location (e.g., GPS coordinates) of the GPMD 106, and/or other information. This identifying information can be used to authenticate the GPMD 106 with the key distribution server 104. The key distribution server 104 can compare the identifying information received from the GPMD 106 to a list of authorized GPMDs 106 in order to authenticate (e.g., verify identify and access permissions) the GPMD 106 with the key distribution server 104. Part of the authentication can include comparing the location from the GPMD 106 to an expected location for the GPMD 106. After authenticating the GPMD 106 and the user 108, the key loading application 128 can be granted access to the database of cryptographic information on the key distribution server 104. The key loading application 128 can also send other information such as the time of day to the key distribution server 104. The key distribution server 104 can log the identifying information and the other information for future reference.

The key loading application 128 can send data identifying the electronic device 102 to the key distribution server 104. The data identifying the electronic device 102 can be obtained from the electronic device 102 itself through communication over the wired communication medium 128 or can be provided to the key loading application 128 by the user 108. In an example, the electronic device 108 is an avionic device (e.g., a communications unit such as a CMU) for operation in an aircraft, and the data identifying the electronic device 108 is an aircraft identifier input by the user 108 to the GPMD 106. The aircraft identifier can include an aircraft tail number for example.

In an example, the key distribution server 104 can receive the data identifying the electronic device 102 and provide cryptographic information to the GPMD 106 based on the data identifying the electronic device 102. In an example, the key distribution server 104 has pre-assigned cryptographic information to the electronic device 102 and provides the pre-assigned cryptographic information to the GPMD 106 based on the data identifying the electronic device 102. In another example, the key distribution server 104 selects or generates cryptographic information for the electronic device 102 and stores information linking the selected/generated cryptographic information to the electronic device 102 based on the data identifying the electronic device 102.

The cryptographic information can be sent to the GPMD 106 over a first path. The first path can include sending the cryptographic information to a browser of the GPMD 106, such as when the cryptographic information is accessed by the GPMD 106 through a web portal. The first path can also include sending the cryptographic information to an email address associated with the GPMD 106. Other means are also possible for the first path, including but not limited to, a file transfer protocol (FTP) transfer and sending the cryptographic information to a central server which is accessed by the GPMD 106 (e.g., through a web portal or other application) to obtain the cryptographic information, such as is common in cloud based storage applications.

In an example, the cryptographic information is wrapped (i.e., encrypted) at the key distribution server 104 and sent as a wrapped version of the cryptographic information to the key loading application 128 on the GPMD 106. To protect the security of the wrapped version of the cryptographic information, an unwrapping code is sent to the user 108 over a different path than the wrapped version of the cryptographic information. That is, the wrapped version of the cryptographic information is sent to the GPMD 106 over a first path as discussed above. The unwrapping code, by comparison, can be sent by the key distribution server 104 to the user 108 over a second path that is different from the first path. For example, if the cryptographic information is sent to a browser executing on the GPMD 106 (first path), the unwrapping code can be sent to an email address of the user 108 (e.g., which can be accessed with the GPMD 106), as a text to a phone number of the user 108 (e.g., to a phone number associated with the GPMD 106), by a voice call (e.g., automated) over a voice channel accessible by the user 108 (e.g., to a phone number associated with the GPMD 106). As used herein a first path is distinct from a second path when the different paths are received by the GPMD 106 using different means (e.g., programs). For example, the following paths are all distinct from one another: browser, email, text, voice channel. However, received data via two different web pages within a browser is not two distinct paths as used herein. As an example, authentication that is required to access one of the paths (e.g., a login for an email) is distinct from any authentication required to access the other path. In some examples, the different paths can both be directed to the same GPMD 106, such that the user 108 can control the wrapped version of the cryptographic information and the unwrapping code via the (same) GPMD 106.

In an alternative example, instead of receiving the cryptographic information from the key distribution server 104, the GPMD 106 can generate cryptographic information for the electronic device 102 and provide information based on the cryptographic information to the key distribution server 104. In an implementation of this example, the electronic device 102 can generate and send a private key to the electronic device 102 and can send a signed public key corresponding to the private key to the key distribution server 104.

In another alternative example, the electronic device 102 can generate cryptographic information for itself and can send information based on the cryptographic information to the GPMD 106 for sending to the key distribution server 104. In an implementation of this example, the electronic device 102 can generate a private key for itself and send a public key corresponding to the private key to the GPMD 106. The GPMD 106 can then provide the public key to the key distribution server 104.

In some examples, the GPMD 106 can send a wrapped version of information to the key distribution server 104 over a first path and an unwrap code for the cryptographic information to the key distribution server 104 over a second path that is distinct from the first path in the same manner as discussed above with respect to the key distribution server 104 sending to the GPMD 106.

In any case, the GPMD 106 can obtain or otherwise generate the cryptographic information for the electronic device 102. In some examples, the unwrap code after being provided to the user 108 over the second path can be input by the user 108 to the key loading application 128 using an appropriate input device 120 of the GPMD 106. After receiving the wrapped version of the cryptographic information and the unwrapping code at the key loading application 128 or generating the cryptographic information and sending it to the key distribution server 104, the key loading application 128 can load the cryptographic information into the electronic device 102. In an example, the key loading application 128 can use the unwrapping code to unwrap (e.g., decrypt) the wrapped version of the cryptographic information and load the unwrapped version of the cryptographic information into the electronic device 102. In another example, the key loading application 128 can load the wrapped version of the cryptographic information into the electronic device 102 and send the unwrapping code to the electronic device 102 such that the electronic device 102 can unwrap the wrapped version of the cryptographic information. In any case, the electronic device 102 can have the cryptographic information loaded therein and can place the cryptographic information in an appropriate storage location.

The key loading application 128 can confirm with the electronic device 102 that the cryptographic information was successfully loaded and can send a message to the key distribution server 104 indicating successful loading of the cryptographic information. Once the cryptographic information is loaded into the electronic device 102, the key loading application 128 can be closed and the connections to the electronic device 102 and the key distribution server 104 can be terminated.

The cryptographic information can include any information which is desired to be kept secret. For example, the cryptographic information can include a cryptographic key used for key agreement, a private key used in a system employing asymmetric key encryption, a symmetric key used in a system employing symmetric key encryption, a digital certificate, a hash function, a password, a PIN, a critical security parameter as defined in a Federal Information Processing Standard (FIPS) 140 series standard, or other cryptographic information. In an example, multiple items of cryptographic information (e.g., multiple symmetric keys) can be loaded into the electronic device 102 using the procedure described above. The GPMD 106 can also be used to load non-secret information into the electronic device 102, such as other aircraft configuration data.

After loading of the cryptographic information, the electronic device 102 can secure (e.g., encrypt) messages using the cryptographic information and send the secured messages to a desired recipient. In examples where the electronic device 102 is an avionic device, the avionic device can activate an avionic datalink (e.g., an air-to-ground link using the Aircraft Communications Addressing and Reporting System (ACARS), a broadband/IP communication to a ground access point, etc.) and can send such secured messages over the avionic datalink. Notably, the above process enables cryptographic information to be securely loaded into an avionic device (e.g., for secure ACARS) or other electronic device by sending the cryptographic information over a different path than the path used by the electronic device for normal communication (e.g., the avionic datalink or other communication connection (e.g., to the Internet 105)).

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes a method for managing cryptographic information, the method comprising: initiating cryptographic information loading application on a general purpose mobile device (GPMD); establishing a connection between the GPMD and a server that includes cryptographic information; receiving an authentication input from a user of the GPMD; sending data identifying the GPMD and the authentication input from the GPMD to the server for authentication of the GPMD and the user; sending data identifying an electronic device into which cryptographic information is to be loaded; receiving the cryptographic information for the electronic device at the GPMD from the server; and sending the cryptographic information from the GPMD to the electronic device for loading therein.

Example 2 includes the method of Example 1, wherein receiving an authentication input from a user includes receiving a password or biometric data.

Example 3 includes the method of any of Examples 1 or 2, wherein sending data identifying the GPMD includes sending one or more of a serial number and a SIM card number for the GPMD; authenticating the GPMD based on the data identifying the GPMD.

Example 4 includes the method of Example 3, wherein sending data identifying the GPMD includes sending a location of the GPMD from the GPMD to the server; at the server, authenticating the GPMD based on comparing the location to an expected location.

Example 5 includes the method of any of Examples 1-4, wherein the electronic device is an avionic device, and wherein sending data identifying an electronic device includes sending an aircraft identifier of an aircraft with which the avionic device is associated.

Example 6 includes the method of Example 5, comprising: securing messages at the avionic device based on the cryptographic information; and sending the secured messages over an avionic datalink.

Example 7 includes the method of any of Examples 1-6, wherein receiving the cryptographic information includes receiving a wrapped version of the cryptographic information via a first path, the method further comprising: receiving an unwrapping code for the cryptographic information via a second path that is distinct from the first path.

Example 8 includes the method of Example 7, comprising: wherein the cryptographic information is received via one of browser of the GPMD or an email address associated with the GPMD; and wherein the unwrapping code is received at the GPMD via one of email, text, or a voice channel.

Example 9 includes a computer readable medium comprising: instructions that are configured to be executed on a general purpose mobile device (GPMD), the instructions, when executed by the GPMD, cause the GPMD to: initiate cryptographic information loading application on a general purpose mobile device (GPMD); establish a connection between the GPMD and a server that includes cryptographic information; receive an authentication input from a user of the GPMD; send data identifying the GPMD and the authentication input from the GPMD to the server for authentication of the GPMD; send data identifying an electronic device into which cryptographic information is to be loaded; receive the cryptographic information for the electronic device at the GPMD from the server; and send the cryptographic information from the GPMD to the electronic device for loading therein.

Example 10 includes the computer readable medium of Example 9, wherein receiving an authentication input from a user includes receiving a password or biometric data.

Example 11 includes the computer readable medium of any of Examples 9 or 10, wherein send data identifying the GPMD includes send one or more of a serial number and a SIM card number for the GPMD.

Example 12 includes the computer readable medium of any of Examples 9-11, wherein the electronic device is an avionic device, and wherein send data identifying an electronic device includes send an aircraft identifier of an aircraft with which the avionic device is associated.

Example 13 includes the computer readable medium of any of Examples 9-12, wherein receiving the cryptographic information includes receiving a wrapped version of the cryptographic information, and wherein the instructions cause the GPMD to: receive an unwrapping code for the cryptographic information from a user; and unwrap the wrapped version of the cryptographic information based on the unwrapping code.

Example 14 includes a system for cryptographic information distribution, the system comprising: a key distribution server including cryptographic information and a list of authorized general purpose mobile devices (GPMDs); and a GPMD having cryptographic information loading application installed thereon, wherein the key loading application is configured to: receive an authentication input from a user; send data identifying the GPMD and the authentication input to the key distribution server; send data identifying an electronic device into which cryptographic information is to be loaded; receive the cryptographic information for the electronic device from the key management server; and send the cryptographic information to the electronic device for loading therein.

Example 15 includes the system of Example 14, wherein receive an input from a user includes receive a password or biometric data.

Example 16 includes the system of any of Examples 14 or 15, wherein send data identifying the GPMD includes send one or more of a serial number and a SIM card number for the GPMD; and wherein the key distribution server is configured to compare the data identifying the GPMD with the list of authorized GPMDs to authenticate the GPMD.

Example 17 includes the system of any of Examples 14-16, wherein the electronic device is an avionic device, and wherein send data identifying the electronic device includes send an aircraft identification number of an aircraft with which the avionic device is associated.

Example 18 includes the system of Example 17, wherein the avionic device is configured to: secure messages device based on the cryptographic information; and send the secured messages over an avionic datalink.

Example 19 includes the system of any of Examples 14-18, wherein receive the cryptographic information includes receive a wrapped version of the cryptographic information via a first path, and wherein the instructions further cause the GPMD to: receive an unwrapping code for the cryptographic information via a second path that is distinct from the first path.

Example 20 includes the system of Example 19, wherein the key distribution server is configured to send the cryptographic information via one of browser of the GPMD or an email address associated with the GPMD; and send the unwrapping code to the GPMD via one of email, text, or a voice channel.

What is claimed is:

1. A method for managing cryptographic information, the method comprising:
   initiating a cryptographic information loading application by one or more processing devices on a general purpose mobile device (GPMD);
   establishing a connection between the GPMD and a server that includes cryptographic information;
   receiving an authentication input from a user of the GPMD;
   sending data identifying the GPMD and the authentication input from the GPMD to the server for authentication of the GPMD and the user;
   sending data identifying an electronic device into which cryptographic information is to be loaded, wherein the electronic device is an avionic device;
   receiving the cryptographic information for the electronic device at the GPMD from the server; and
   sending the cryptographic information from the GPMD to the electronic device for loading therein.

2. The method of claim 1, wherein receiving an authentication input from a user includes receiving a password or biometric data.

3. The method of claim 1, wherein sending data identifying the GPMD includes sending one or more of a serial number and a SIM card number for the GPMD;
   authenticating the GPMD based on the data identifying the GPMD.

4. The method of claim 3, wherein sending data identifying the GPMD includes sending a location of the GPMD from the GPMD to the server;
   at the server, authenticating the GPMD based on comparing the location to an expected location.

5. The method of claim 1, wherein sending data identifying an electronic device includes sending an aircraft identifier of an aircraft with which the avionic device is associated.

6. The method of claim 5, comprising:
   securing messages at the avionic device based on the cryptographic information; and
   sending the secured messages over an avionic datalink.

7. The method of claim 1, wherein receiving the cryptographic information includes receiving a wrapped version of the cryptographic information via a first path, the method further comprising:
   receiving an unwrapping code for the cryptographic information via a second path that is distinct from the first path.

8. The method of claim 7, comprising:
   wherein the cryptographic information is received via one of browser of the GPMD or an email address associated with the GPMD; and
   wherein the unwrapping code is received at the GPMD via one of email, text, or a voice channel.

9. A non-transitory computer readable medium comprising:
   instructions that are configured to be executed on a general purpose mobile device (GPMD), the instructions, when executed by the GPMD, cause the GPMD to:
      initiate cryptographic information loading application on a general purpose mobile device (GPMD);
      establish a connection between the GPMD and a server that includes cryptographic information;
      receive an authentication input from a user of the GPMD;
      send data identifying the GPMD and the authentication input from the GPMD to the server for authentication of the GPMD;

send data identifying an electronic device into which cryptographic information is to be loaded, wherein the electronic device is an avionic device;

receive the cryptographic information for the electronic device at the GPMD from the server; and send the cryptographic information from the GPMD to the electronic device for loading therein.

10. The computer readable medium of claim 9, wherein receiving an authentication input from a user includes receiving a password or biometric data.

11. The computer readable medium of claim 9, wherein send data identifying the GPMD includes send one or more of a serial number and a SIM card number for the GPMD.

12. The computer readable medium of claim 9, wherein send data identifying an electronic device includes send an aircraft identifier of an aircraft with which the avionic device is associated.

13. The computer readable medium of claim 9, wherein receiving the cryptographic information includes receiving a wrapped version of the cryptographic information, and wherein the instructions cause the GPMD to:

receive an unwrapping code for the cryptographic information from a user; and unwrap the wrapped version of the cryptographic information based on the unwrapping code.

14. A system for cryptographic information distribution, the system comprising:

a key distribution server including cryptographic information and a list of authorized general purpose mobile devices (GPMDs); and a GPMD having cryptographic information loading application installed thereon, wherein the key loading application is configured to:

receive an authentication input from a user;

send data identifying the GPMD and the authentication input to the key distribution server;

send data identifying an electronic device into which cryptographic information is to be loaded, wherein the electronic device is an avionic device;

receive the cryptographic information for the electronic device from the key management server; and send the cryptographic information to the electronic device for loading therein.

15. The system of claim 14, wherein receive an input from a user includes receive a password or biometric data.

16. The system of claim 14, wherein send data identifying the GPMD includes send one or more of a serial number and a SIM card number for the GPMD; and wherein the key distribution server is configured to compare the data identifying the GPMD with the list of authorized GPMDs to authenticate the GPMD.

17. The system of claim 14, wherein send data identifying the electronic device includes send an aircraft identification number of an aircraft with which the avionic device is associated.

18. The system of claim 17, wherein the avionic device is configured to:

secure messages device based on the cryptographic information; and send the secured messages over an avionic datalink.

19. The system of claim 14, wherein receive the cryptographic information includes receive a wrapped version of the cryptographic information via a first path, and wherein the instructions further cause the GPMD to:

receive an unwrapping code for the cryptographic information via a second path that is distinct from the first path.

20. The system of claim 19, wherein the key distribution server is configured to send the cryptographic information via one of browser of the GPMD or an email address associated with the GPMD; and send the unwrapping code to the GPMD via one of email, text, or a voice channel.

* * * * *